No. 817,339. PATENTED APR. 10, 1906.
G. R. ROBINSON.
COTTON CHOPPER.
APPLICATION FILED AUG. 2, 1905.

2 SHEETS—SHEET 1.

Witnesses
Jas. K. McCathran
J. F. Riley

George R. Robinson, Inventor

By C. G. Siggers
Attorney

No. 817,339. PATENTED APR. 10, 1906.
G. R. ROBINSON.
COTTON CHOPPER.
APPLICATION FILED AUG. 2, 1905.
2 SHEETS—SHEET 2.
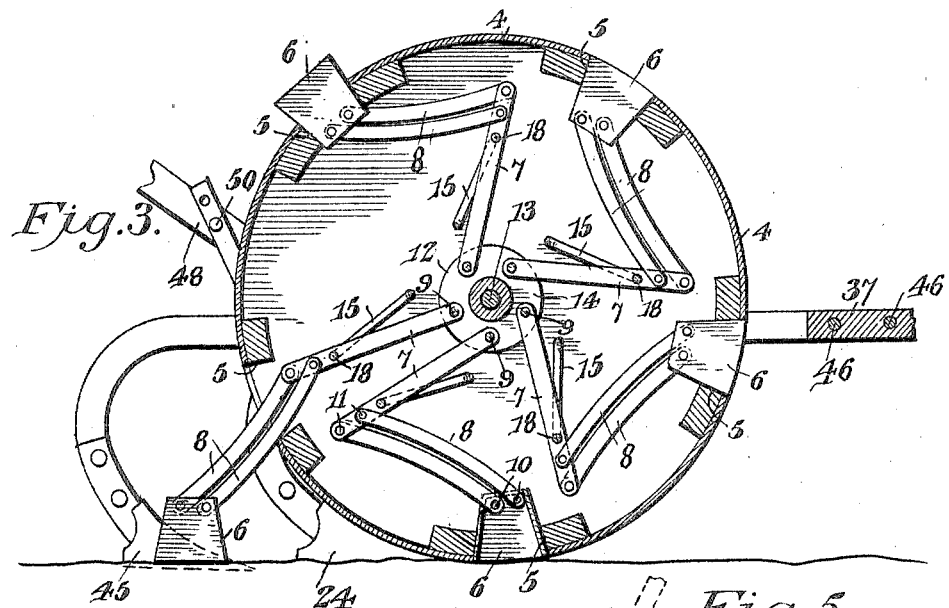
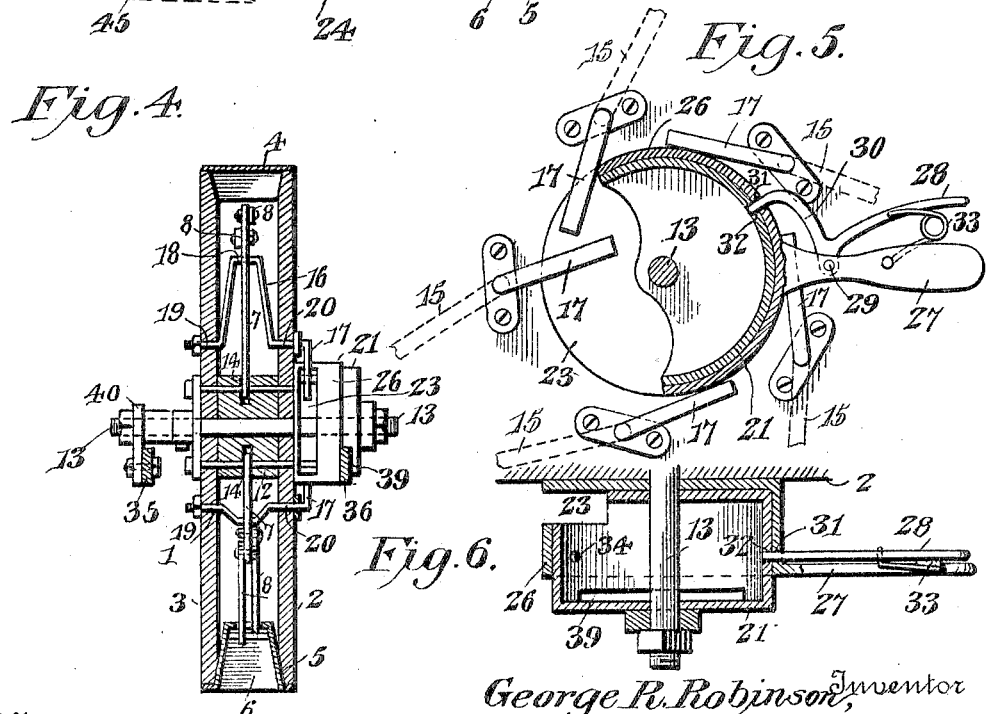
George R. Robinson, Inventor
Witnesses
Jas. K. McCathran
H. F. Riley
By C. G. Siggers
Attorney

UNITED STATES PATENT OFFICE.

GEORGE RANSOM ROBINSON, OF BIENVILLE, LOUISIANA.

COTTON-CHOPPER.

No. 817,339.  Specification of Letters Patent.  Patented April 10, 1906.

Application filed August 2, 1905. Serial No. 272,411.

*To all whom it may concern:*

Be it known that I, GEORGE RANSOM ROBINSON, a citizen of the United States, residing at Bienville, Bienville parish, and State of Louisiana, have invented a new and useful Cotton-Chopper, of which the following is a specification.

The invention relates to improvements in cotton-choppers.

The object of the present invention is to improve the construction of cotton-choppers and to provide a simple and comparatively inexpensive cotton-chopper adapted to reduce the number of cotton-hills and capable of cultivating the plants left standing and of providing means for affording absolute protection to such plants for preventing the same from being covered up or destroyed during the operation of thinning out the plants and cultivating those left standing.

A further object of the invention is to provide a cotton-chopper adapted to leave hills and plants at regular intervals and capable of rolling and crushing the intervening or intermediate plants and of covering the latter with soil to prevent the same from growing.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction, within the scope of the claims, may be resorted to without departing from the spirit or sacrificing any of the advantages of the invention.

Figure 1:
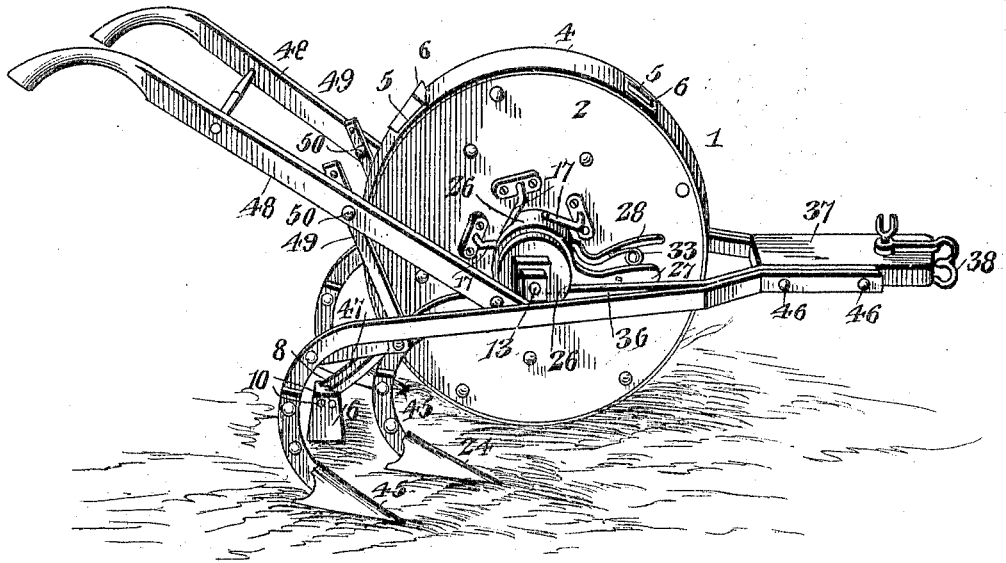
Figure 2:
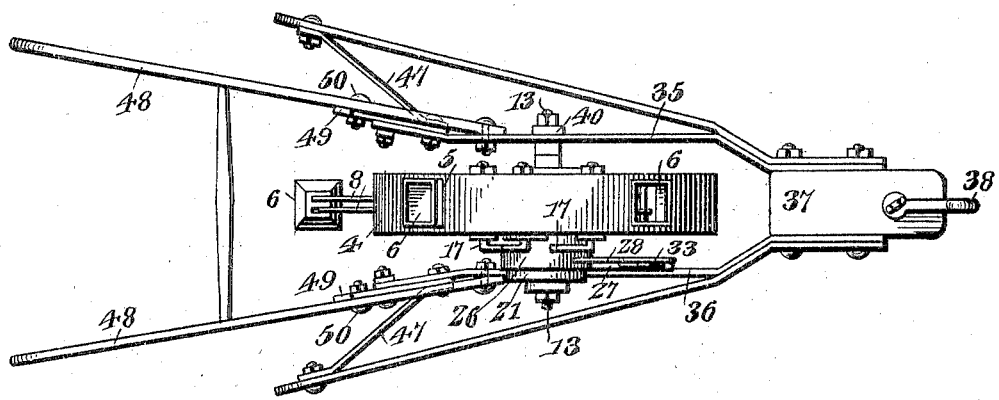

In the drawings, Figure 1 is a perspective view of a cotton-chopper constructed in accordance with this invention. Fig. 2 is a plan view of the same. Fig. 3 is a longitudinal sectional view. Fig. 4 is a transverse sectional view. Fig. 5 is an enlarged detail sectional view illustrating the construction of the cams for returning the cups to the rolling-drum or crushing-wheel and for holding them within the same. Fig. 6 is a horizontal sectional view of the cams.

Like numerals of reference designate corresponding parts in all the figures of the drawings.

1 designates a rolling-drum or crushing-wheel composed of two circular heads 2 and 3 and a connecting rim or band 4, forming the periphery of the drum or wheel and provided at intervals with openings 5 for the reception of cups 6. The cups 6, which are tapered, are open at the outer end and closed at the inner end and are adapted to cover the plants left standing, the smooth periphery of the wheel between the openings being adapted to roll the soil and crush the hills and plants between those left standing and protected by the cups. The rolling-drum or crushing-wheel may be of any desired size, and the openings and cups may be arranged at any desired interval to provide the desired spaces between the plants left standing, and the cups, which are successively extended from the rolling-drum or crushing-wheel, are adapted to rest lightly over the plants, and they protect the same during the thinning and cultivating operations. Each cup is carried by an extensible connection composed of inner and outer bars or members 7 and 8, the inner bar being pivoted at its inner end at 9 to the drum or wheel at the center thereof. Two outer bars 8 are provided and are pivoted at their outer ends to the cups by transverse pins 10, located at the inner end or top of the cup. The inner ends of the bars 8 are pivoted to the outer portion of the inner bar or member 7 by means of separate pivots 11, spaced apart, as clearly shown in Fig. 2 of the drawings. The inner end or top of the cup 6 is slotted to receive the outer ends of the bars or members 8, and the inner ends of the latter are preferably arranged at the opposite sides of the inner bar or member 7. The drum or wheel is provided at its center with a hub 12, which receives an axle 13 and which is provided with a central slot 14 for the reception of the inner ends of bars or members 7. The pivot-pins 9 pierce the heads of the drum or wheel and the hub and secure the latter to the former.

The extensible connections are positively actuated to retract the cups and move the same inwardly into the drum or wheel by means of operating-levers 15, composed of interiorly and exteriorly arranged arms 16 and 17. The interiorly-arranged arm 16 is preferably in the form of a U-shaped loop, which is composed of sides and a transverse connecting portion 18, located at the outer end of the lever and piercing the inner bar or member 7 at the outer portion thereof. The sides of the loop are provided at their inner ends with laterally-extending pivots 19 and 20, which pierce the sides or heads of the drum or wheel. The pivot 20 connects the interiorly and exteriorly arranged arms and is preferably formed integral with the same. The operating-levers may be constructed in any other desired manner, and the exterior arms 17, which are arranged at one side of the drum or wheel, are adapted to engage a cam 21, arranged in the path of the arms and consisting of a mutilated hollow cylinder mounted on the shaft or axle and having a cut-away portion 23, in which the exterior arms move while the cups are in their extended position. The cam is cut away at the bottom and at the rear side, and when a cup arrives at the bottom of the drum or wheel and is carried over a hill it is adapted to rest lightly on the hill and cover and protect the plants thereof. The cup at the bottom is arranged over the plants of a hill and remains by gravity in such position, the extensible connections permitting the drum or wheel to advance independently of the cup until a pair of inner plows 24 have advanced beyond the said cup. The solid portion of the periphery of the drum or wheel crushes the plants between the covered hills, and the inner plows 24 cover the crushed plants with soil. The rearmost cup is then lifted from the hill and the protected plants by the rotary movement of the drum or wheel, and it gradually moves inward by gravity until it is positively actuated by reason of the exterior arm of its operating-lever coming in contact with the cam at the top thereof. The operating-lever positively draws the cup inwardly and holds it in such position to prevent the cup from dropping and moving outward while it is descending at the front of the drum or wheel.

In order to lock the cups within the drum or wheel to enable the cotton-chopper to be moved from one place to another without operating the cups, a second cam 26 is provided. The cam 26 consists of a mutilated cylindrical member open at the outer side and fitted on the inner end of the fixed cam or member and provided with a grip or handle 27. The cam 26 is cut away like the cam 21, and when the parts are arranged as illustrated in Fig. 5 of the drawings the two cut-away portions register and provide an opening for the exteriorly-arranged arms of the operating-levers. The exterior cam or member is retained in the position shown in Fig. 5 by means of a spring-actuated latch 28, consisting of an angle-lever fulcrumed at its angle by a pivot 29 and having inner and outer arms. The inner arm 30, which is approximately L-shaped, extends through registering perforations 31 and 32 of the fixed and rotary members and is maintained in engagement with such parts by means of a spring 33, mounted on the handle or grip 27 and engaging the outer arm of the latch. The latch is also adapted to lock the rotary member in a position for covering the cut-away portion 23 of the fixed cam or member, a suitable perforation 34 being provided for this purpose. The movable cam or member has a peripheral engaging portion which is adapted to complete the peripheral engaging portion of the fixed cam or member, so that the two cams present a circular surface concentric with the shaft.

The inner plows are provided with a pair of opposite beams 35 and 36, spaced from the drum or wheel and secured at their front ends to a stock or bar 37, which is provided with a suitable clevis 38. The beam 36 is secured in a slot 39 of the fixed cam or member, and the other beam 35 is provided with an upwardly-projecting bracket or plate 40 for the reception of the axle 13, which centrally pierces the fixed and movable cams or members. The cotton-chopper is also provided with a pair of outer plows 45, detachably secured at the front ends of their beams to the front portions of the beams of the inner plows by means of transverse bolts 46, which also secure the inner plow-beams to the stock or bar. The rear portions of the outer beams are connected with the inner beams by braces 47, and the inner beams support a pair of handles 48, secured at their lower ends to the outer faces of the inner beams and arranged at an inclination. The inclined handles, which are connected in the usual manner by a transverse rung, are adjustably held in an inclined position by means of bars or braces 49, secured at their lower ends to the inner beams and connected at their upper portions to the inner faces of the handles. The bars or braces are provided at their upper portions with a plurality of perforations for the reception of the bolts 50, which secure them to the handles. The outer beams are adapted to be readily removed, and the cotton-chopper may be used with the inner beams only when desired.

Having thus fully described my invention, what I claim as new, and desire to secure by Letters Patent, is—

1. A machine of the class described provided with a drum or wheel having crushing portions and provided also with openings, and extensible means movable inwardly and outwardly through the openings for protecting the plants.

2. In a machine of the class described, the combination with cultivating means, of a crushing drum or wheel provided with extensible plant-protecting means arranged to cover and protect the plants during the crushing and cultivating operations.

3. In a machine of the class described, the combination of a crushing drum or wheel provided at intervals with openings, and extensible cups movable inwardly and outwardly through the openings.

4. In a machine of the class described, the combination of a crushing drum or wheel provided at intervals with peripheral openings and having crushing portions between the openings, cups arranged at the openings, extensible connections between the cups and the drum or wheel, and means for operating the extensible connections.

5. In a machine of the class described, the combination of a crushing drum or wheel, a cup, extensible connecting means mounted on the drum or wheel and carrying the cup for moving the same inward and outward, an operating-lever for the extensible connection, and means for actuating the lever automatically.

6. In a machine of the class described, the combination of a crushing drum or wheel, an extensible cup, an extensible connection for the cup embodying inner and outer bars or members pivotally connected, an operating-lever for the extensible connection, and a cam arranged in the path of and adapted to actuate the operating-lever.

7. In a machine of the class described, the combination of a crushing drum or wheel, an extensible cup, an inner bar or member pivotally mounted within the drum or wheel, a pair of outer bars or members pivotally connected to the inner bar or member and the cup, and means for automatically actuating the inner bar or member.

8. In a machine of the class described, the combination of a crushing drum or wheel, a cup, an extensible connection mounted on the drum or wheel and carrying the cup, an operating-lever, and a cam arranged in the path of the operating-lever for moving the cup inward, said cam being also arranged to permit a free outward movement of the cup during a portion of the revolution of the drum or wheel.

9. In a machine of the class described, the combination of a crushing drum or wheel provided at intervals with cups, extensible connections mounted on the drum or wheel and carrying the cups, operating-levers for actuating the extensible connection to move the cups inward, and a cam arranged in the path of the operating-levers for positively moving the cups inward and for holding the cups within the drum or wheel during a portion of the revolution of the same.

10. In a machine of the class described, the combination of a crushing drum or wheel provided at intervals with cups, extensible connections mounted on the drum or wheel and carrying the cups, operating-levers for actuating the extensible connection to move the cups inward, and a cam arranged in the path of the operating-levers for positively moving the cups inward and for holding the cups within the drum or wheel during a portion of the revolution of the same, said cam being also arranged to permit a free outward movement of the cups during the other portion of the revolution of the drum or wheel.

11. In a machine of the class described, the combination of a crushing drum or wheel provided at intervals with cups, extensible connecting means mounted on the drum or wheel and carrying the cups to permit the latter to move inwardly and outwardly, operating-levers mounted on the drum or wheel, a cam arranged to engage the levers during a portion of the revolution of the drum or wheel for retracting the cups and for holding the same within the drum or wheel, and a movable member coöperating with the cam and adapted to engage the levers during the remaining portion of the rotation of the drum or wheel for preventing the cups from moving outwardly.

12. In a machine of the class described, the combination of a crushing drum or wheel, cups arranged at intervals, extensible connections mounted on the wheel and carrying the cups, operating-levers for actuating the extensible connections, a fixed cam arranged in the path of the operating-levers and having a concentric peripheral portion for engaging the same, and a movable member mounted on the fixed cam for completing the peripheral portion thereof.

13. In a machine of the class described, the combination of a crushing drum or wheel, cups arranged at intervals, extensible connections mounted on the wheel and carrying the cups, operating-levers for actuating the extensible connections, a fixed cam arranged in the path of the operating-levers and having a concentric peripheral portion for engaging the same, a movable member mounted on the fixed cam for completing the peripheral portion thereof, and a latch for locking the movable member in either of its positions.

14. In a machine of the class described, the combination of a crushing drum or wheel, cups arranged at intervals, extensible connections mounted on the wheel and carrying the cups, operating-levers for actuating the extensible connections, a fixed cam arranged in the path of the operating-levers and having a concentric peripheral portion for engaging the same, a movable member mounted on the fixed cam for completing the peripheral portion thereof, a handle or grip extending from the movable member, and a spring-actuated latch mounted on the handle or grip for locking the movable member in either of its positions.

15. In a machine of the class described, the combination of a crushing drum or wheel, a cup, an extensible connection consisting of inner and outer bars pivotally connected, an operating-lever provided with a substantially U-shaped interiorly-arranged arm connected with the inner bar or member, said lever being also provided with an exteriorly-arranged arm, and means arranged in the path of the exteriorly-arranged arm for operating the said lever.

In testimony that I claim the foregoing as my own I have hereto affixed my signature in the presence of two witnesses.

GEORGE RANSOM ROBINSON.

Witnesses:
GEO. F. WILSON,
J. T. BRYAN.